United States Patent [19]

Kimura et al.

[11] 4,388,912

[45] Jun. 21, 1983

[54] EXHAUST GAS RECIRCULATION CONTROL SYSTEM FOR A DIESEL ENGINE

[75] Inventors: Yoshiyuki Kimura, Yokosuka; Masaji Shiobara, Chigasaki; Yasutaka Yoshiba, Chiba, all of Japan

[73] Assignee: Nissan Motor Company, Limited, Yokohama, Japan

[21] Appl. No.: 285,544

[22] Filed: Jul. 21, 1981

[30] Foreign Application Priority Data

Jul. 23, 1980 [JP] Japan .................................. 55-100898

[51] Int. Cl.³ ............................................ F02M 25/06
[52] U.S. Cl. ..................................... 123/569; 123/571
[58] Field of Search .................................. 123/569, 571

[56] References Cited

U.S. PATENT DOCUMENTS 4,313,415  2/1982  Shinzawa et al. .................... 123/569
4,333,438  6/1982  Perez et al. .......................... 123/569

Primary Examiner—Wendell E. Burns
Attorney, Agent, or Firm—Schwartz, Jeffery, Schwaab, Mack, Blumenthal & Koch

[57] ABSTRACT

An exhaust gas recirculation control system such that the throttle valve is controlled by two vacuum actuators through three stages of fully-opened, half-opened, and fully closed positions, in addition to the control of the exhaust gas recirculation control valve, in accordance with the engine operating conditions including engine load. The EGR valve is fully closed under a heavy engine load and fully opened under a medium and light engine load, and the throttle valve is fully opened under a heavy engine load, half opened under a medium engine load, and fully closed under a light engine load, under due consideration of engine speed.

30 Claims, 5 Drawing Figures

EXHAUST GAS RECIRCULATION CONTROL SYSTEM FOR A DIESEL ENGINE

BACKGROUND OF THE INVENTION

1. Field of the Invention

The present invention relates generally to an exhaust gas recirculation control system used for a diesel engine, and more specifically to an exhaust gas recirculation control system controlling the throttle valve in addition to the control of the exhaust gas recirculation valve such that exhaust gas recirculation can be optimized in accordance with the engine operating conditions including engine load.

2. Description of the Prior Art

As in an gasoline engine in general, a diesel engine is provided with an exhaust gas recirculation system, whereby an inert exhaust gas is recirculated within the combustion chamber in order to lower the combustion temperature, that is, to suppress the generation of $NO_x$ contained in the exhaust gas as an injurious component.

In the prior-art exhaust gas recirculation control system, however, since the control lever of the fuel injection pump and the throttle valve are both linked with the accelerator pedal mechanically, the force required to depress the accelerator pedal increases and the exhaust gas recirculation control valve opens a little to perform the recirculation operation even when the engine speed is low under a relatively heavy load. In addition, the intake air loss due to improper throttle valve operation causes incomplete combustion, resulting in emission of a large amount of smoke.

A more detailed description of the prior-art exhaust gas recirculation system will be made hereinafter with reference to the attached drawing under DETAILED DESCRIPTION OF PREFERRED EMBODIMENTS.

SUMMARY OF THE INVENTION

With these problems in mind therefore, it is the primary object of the present invention to provide an exhaust gas recirculation control system for a diesel engine such that the throttle valve is controlled by two diaphragm devices (vacuum actuators) into the three fully-opened, half-opened, and fully-closed positions, in addition to the control of the exhaust gas recirculation control valve, in accordance with engine operating conditions including engine load, so that exhaust gas recirculation can be optimized, preventing emission of smoke.

To achieve the above-mentioned object, the exhaust gas recirculation control system according to the present invention comprises an exhaust gas recirculation control valve disposed in an exhaust gas recirculation duct, a throttle valve disposed on the upstream side of the intake duct, two diaphragm devices to control the stepwise opening of the throttle valve, and a control unit to control the exhaust gas recirculation control valve and the throttle valve independently in accordance with the signals generated from sensors for detecting engine operating conditions.

In the exhaust gas recirculation control system according to the present invention, the exhaust gas recirculation valve is fully closed when the engine load is heavy and fully opened when the engine load is medium and light, and said throttle valve is fully opened when the engine load is heavy, half opened when the engine load is medium, and fully closed when the engine load is light.

BRIEF DESCRIPTION OF THE DRAWINGS

The features and advantages of the exhaust gas recirculation control system for a diesel engine according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

To facilitate understanding of the present invention, a brief reference will be made to a prior-art exhaust gas recirculation control system. Hereinafter, "exhaust gas recirculation" is referred to as simply EGR.

Figure 1:
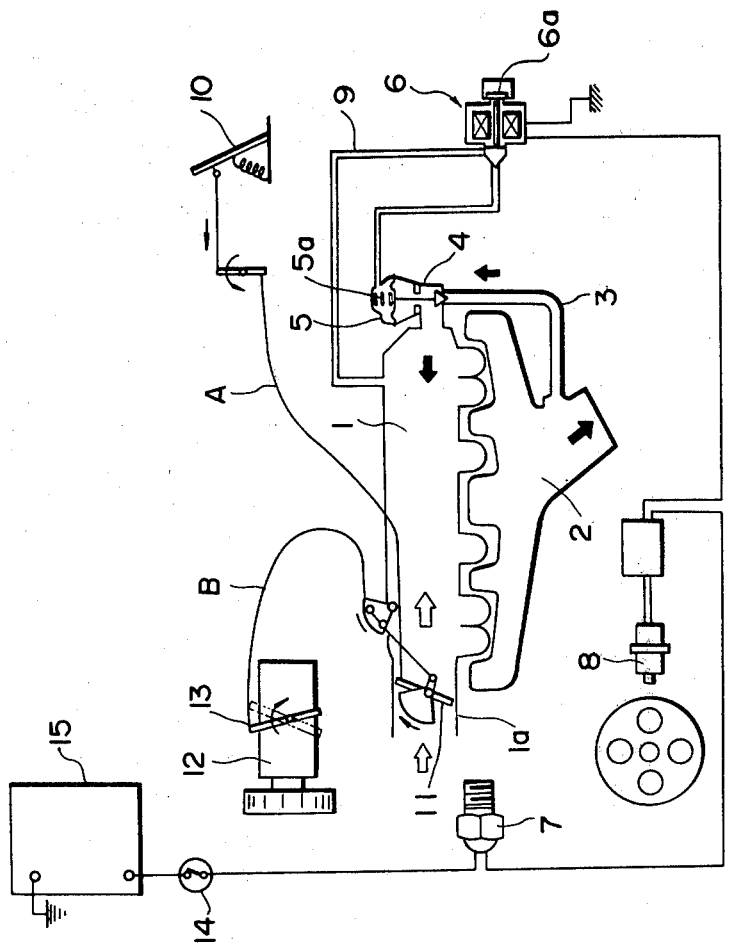
FIG. 1 is a diagrammatical view illustrating the configuration of a prior-art exhaust gas recirculation control system.

With reference to FIG. 1, an EGR duct 3 is provided between an intake manifold 1 serving as a part of the intake duct and an exhaust manifold 2 serving as exhaust duct, and an EGR control valve 4 is provided midway on the EGR duct 3 in order to control (open or close) the EGR duct 3 in accordance with the operating conditions of the engine.

The EGR control valve 4 comprises a diaphragm device 5 used as an actuator, which opens or closes when atmospheric pressure or vacuum pressure (intake vacuum pressure from the engine in FIG. 1) are selectively introduced into a pressure chamber 5a of a diaphragm device 5 through a three-way electromagnetic valve 6. Further, in this figure, the reference numeral 6a denotes a vent open to the atmospheric pressure.

The above-mentioned three-way electromagnetic valve 6 is energized when a coolant temperature sensor 7 detects that coolant temperature rises beyond a predetermined low limit and when an engine speed sensor 8 detects that engine speed drops below a predetermined high limit. When energized, the three-way valve 6 switches its duct so that vacuum is applied to the pressure chamber 5a from the intake manifold 1 through the vacuum duct 9.

When vacuum is applied to the pressure chamber of the diaphragm device 5, the EGR control valve 4 is opened so as to introduce some of exhaust gas into the intake manifold 1 through the EGR duct 3.

On the other hand, on the upstream side of the intake manifold 1, a throttle valve 11 is linked with an accelerator pedal 10 through a wire A or the like. In addition, a control lever 13 of a fuel injection pump 12 is linked through a wire B or the like with the throttle valve 11.

Therefore, within a low-load region where the accelerator pedal 10 is depressed lightly, since the control lever 13 moves only slightly, the amount of fuel injection is small; the throttle valve 11 opens a little; the intake duct 1a is throttled; vacuum pressure increases on the downstream side of the throttle valve 11; as a result, a large quantity of EGR gas is introduced into the intake manifold 1 from the exhaust manifold 2 when the EGR control valve 4 is opened at a low engine speed.

On the other hand, within a high-load region where the accelerator pedal 10 is depressed heavily, since the control lever 13 moves greatly, the amount of fuel injection is increased; the throttle valve 11 opens wide; the intake duct 1a is not throttled; vacuum pressure decreases on the downstream side of the throttle valve 11; as a result, the amount of EGR gas is restricted even when the EGR control valve is open.

Further in this figure, the reference numeral 14 denotes an ignition switch and the numeral 15 denotes a battery, respectively.

In the prior-art EGR control system used with a diesel engine, as described hereinabove, an appropriate amount of EGR is obtained by controlling the intake vacuum in accordance with the operating conditions of the engine such as engine speed and coolant temperature.

In the prior-art EGR control system, however, since the control lever 13 of the fuel injection pump 12 and the throttle valve 11 are both linked with the accelerator pedal 10 mechanically, the force required to depress the accelerator pedal 10 increases in proportion to the angle of the pedal and the EGR control valve 4 opens to perform the EGR operation when the engine speed is low under a heavy load. In addition, the lack of intake air due to the throttle valve 11 position causes incomplete combustion, thus causing emission of a large amount of smoke.

Figure 2:
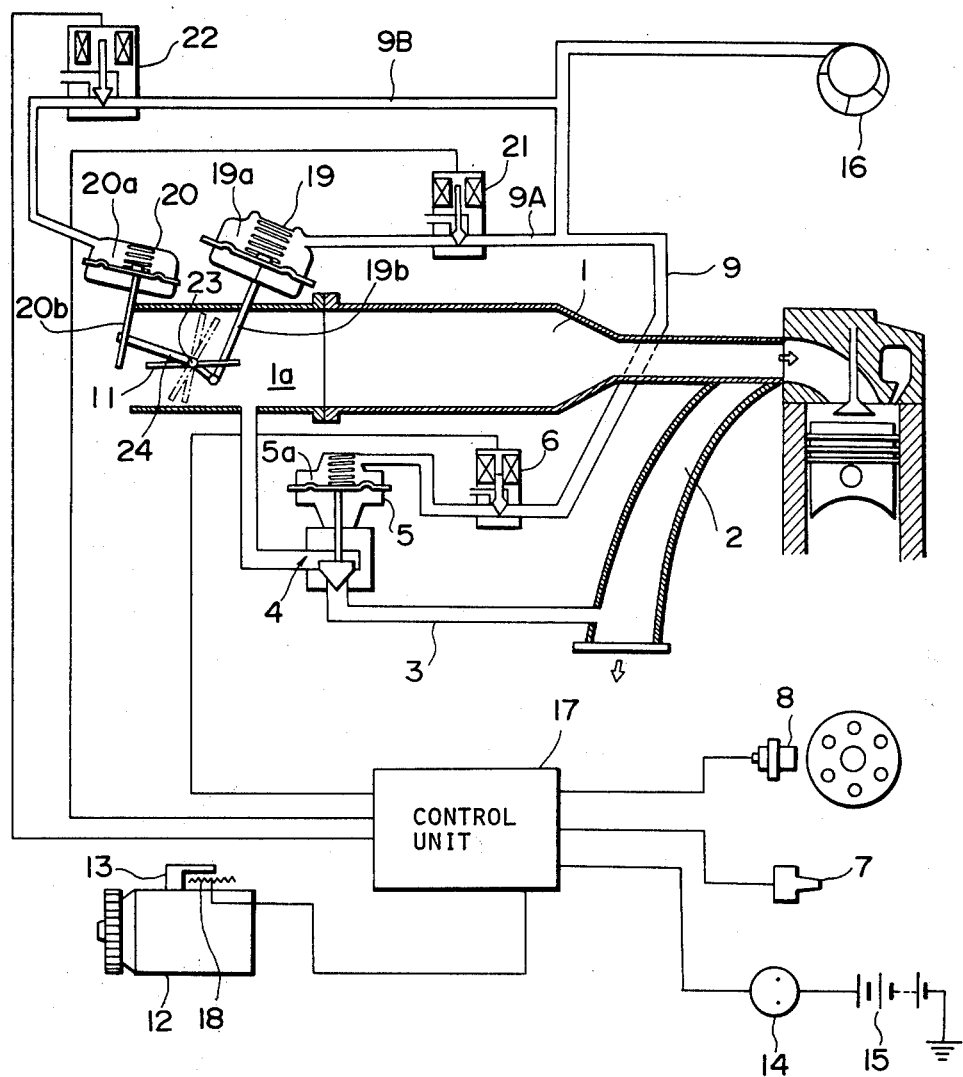
FIG. 2 is a diagrammatical view illustrating the configuration of a first embodiment of the exhaust gas recirculation control system according to the present invention.

In view of the above description, reference is now made to FIGS. 2 to 6, and more specifically to FIG. 2, in which a first embodiment of an EGR control system for a diesel engine according to the present invention is described.

In this embodiment, the throttle valve is actuated by a plurality of diaphragm devices, similar to the EGR control valve, and further a plurality of three-way electromagnetic valves, provided along the respective vacuum ducts serving to apply vacuum signals to these diaphragm devices, and the EGR control valve are controlled separately by a control circuit serving to output the respective output signals in accordance with the signals generated from various sensors to detect the engine operating conditions.

In FIG. 2, the reference numeral 1 denotes an intake manifold of a part of an intake duct, the numeral 2 denotes an exhaust manifold of a part of an exhaust duct, and the numeral 3 denotes an EGR duct, as in FIG. 1.

An EGR control valve 4 disposed on the EGR duct 3 is controlled (opened or closed) when vacuum or atmospheric pressure applied from a vacuum pump 16 is selectively introduced into a pressure chamber 5a within a diaphragm device 5 through a first three-way electromagnetic valve 6 disposed along a vacuum duct 9. Further, in this embodiment, it is possible to use, as a vacuum source, the vacuum in an intake tube provided on the downstream side of a throttle valve 11, as is the case in FIG. 1, without using the vacuum pump 16.

The above-mentioned three-way electromagnetic valve 6 is controlled by a signal applied from a control unit 17 explained later, in order to open or close the vacuum duct 9, such that vacuum is applied to the pressure chamber 5a in a first diaphragm device 5 (to open the EGR control valve) or atmospheric pressure is applied thereto (to close the EGR control valve) in accordance with the operating conditions of the engine.

On the other hand, to the throttle valve 11, disposed in the intake duct 1a on the upstream side of the position where the EGR duct 3 is connected, second and third diaphragm devices 19 and 20 to actuate the throttle valve 11 are connected. Into the pressure chambers 19a and 20a within these two diaphragm devices 19 and 20, vacuum or atmospheric pressure from the vacuum pump 16 is selectively introduced through second and third three-way electromagnetic valves 21 and 22 disposed on the two vacuum ducts 9A and 9B branching from the vacuum duct 9, respectively, so that the throttle valve 11 is actuated stepwise (fully-open, half-open, or fully-closed). Further, the above-mentioned second and third three-way electromagnetic valves 21 and 22 are controlled by the control circuit 17 independently, in the same manner as in the first three-way electromagnetic valve 6.

Figure 3:
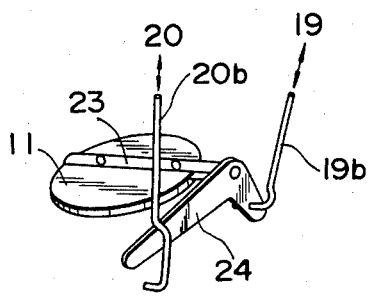
FIG. 3 is an enlarged fragmentary perspective view of a throttle provided with a crank lever and a valve rod used with the exhaust gas recirculation control system according to the present invention.

To explain the movement of the throttle valve in more detail, as depicted in FIG. 3, the end of a diaphragm rod 20b connected to the diaphragm device 20 is bent into a hook shape. Accordingly, when vacuum is introduced into the pressure chamber 20a and the diaphragm rod 20 is moved upward, the diaphragm rod 20 is brought into contact with one end of the longer leverage portion of a crank lever 24 fixed to a rotational shaft 23 of the throttle valve 11 in order to the throttle valve 11 forcedly to the half-open position against the reaction force of the other diaphragm device 19 described later. On the other hand, the diaphragm rod 20 is so designed that when atmospheric pressure is introduced into the pressure chamber 20a and the diaphragm rod 20 is moved downward, it is not brought into contact with the crank lever 24. Accordingly, in this case, the position of the throttle valve 11 is determined by the actuation of the other diaphragm device 19.

The second diaphragm rod 19b of the second diaphragm device 19 is pivotably connected to one end of the shorter leverage portion of the crank lever 24. Accordingly, when vacuum is introduced into the pressure chamber 19a and the diaphragm rod 19 moves upward in FIG. 3, the diaphragm rod 19 closes the throttle valve 11 (down to the necessary minimum open position) irrespective of the actuation of the diaphragm rod 20b of the diaphragm device 20. When atmospheric pressure is introduced into the pressure chamber 19a and the diaphragm rod 19 moves downward in FIG. 3, the diaphragm rod 19 fully opens the throttle valve 11. (When the second diaphragm device 19 is being actuated, the valve 11 is restricted to the half-open position.)

To the above-mentioned control circuit 17, various signals representative of engine operating conditions are inputted, for instance, a signal generated from an engine speed sensor 8 (which detects the revolution of the crank pulley or the flywheel), a signal generated from a potentiometer 18, serving as an engine load sensor to convert into an electric signal the angle of the control lever 13 in a fuel injection pump 12 controlled by the accelerator pedal, or a signal generated from a temperature sensor 7 to detect engine coolant temperature.

The above-mentioned three three-way electromagnetic valves 6, 21, and 22 are controlled and switched separately in accordance with these signals, that is, the engine operating conditions after these signals, that is, the engine operating conditions after these signals have been processed through the control circuit 17.

Figure 4:
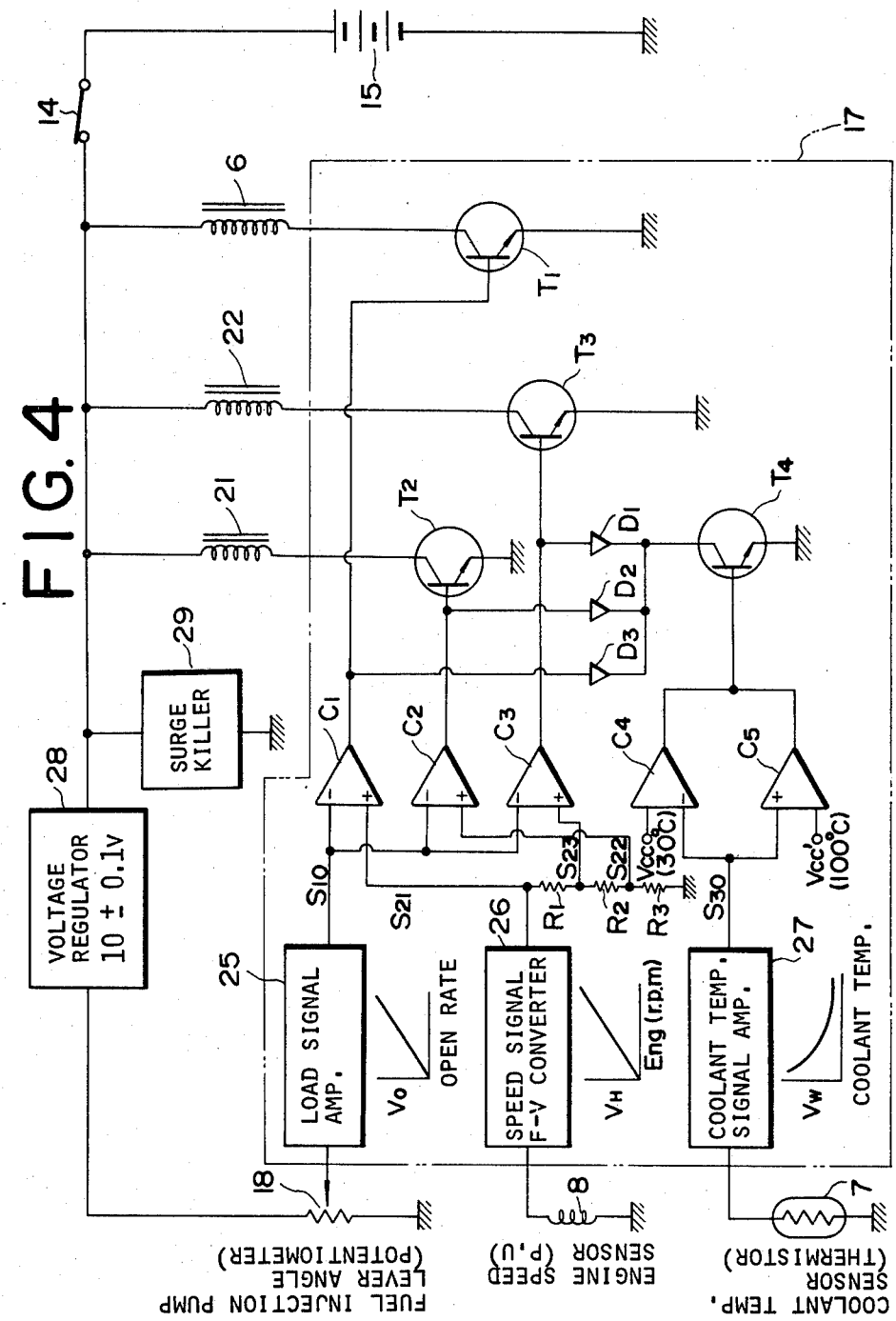
FIG. 4 is a schematic diagram illustrating the configuration of a control circuit used with the exhaust gas recirculation control system according to the present invention.

FIG. 4 shows a circuit configuration of the control unit 17.

In the figure, the reference numeral 25 denotes a load signal amplifier to amplify the engine load detection signal such as a signal detected by the potentiometer 18 to indicate the angle of the control lever 13 of the fuel injection pump 12, the numeral 26 denotes a F-V converter to convert into a voltage signal the detection pulse signal generated from the engine speed sensor 8, and the numeral 27 denotes an amplifier to amplify the detection signal generated from the coolant temperature sensor 7.

The output signal from the amplifier 25 is inputted to the respective input terminals (−) of three comparators $C_1$, $C_2$ and $C_3$. The output signal from the F-V converter 26 is inputted to the input terminal (+) of the comparator $C_1$ directly and to the respective input terminals (+) of the comparators $C_2$ and $C_3$ after having been divided with the resistors $R_1$, $R_2$, and $R_3$.

In this control circuit, the signal $S_{10}$ sent from the load signal amplifier 25 (a signal sent from the potentiometer 18) is compared with the signal $S_{21}$ sent from the speed signal F-V converter. When $S_{10}$ is below $S_{21}$ in potential level, the comparator $C_1$ outputs a high-level signal to turn on the switching transistor $T_1$, so that a current is passed from the battery 15 through the firt three-way electromagnetic valve 6 via an ignition switch 14 in order to energize the first three-way electromagnetic valve 6, that is, to apply a vacuum to the first diaphragm device 5 for opening fully the EGR control valve 4.

Similarly, the signal $S_{10}$ sent from the load signal amplifier 25 (a signal sent from the potentiometer 18) is compared with the signal $S_{22}$ sent from the speed signal F-V converter which is present to be lower than $S_{21}$ by the resistors $R_1$, $R_2$, and $R_3$. When $S_{10}$ is below $S_{22}$ in potential level, the comparator $C_2$ outputs a high-level signal to turn on the switching transistor $T_2$, so that a current is passed from the battery 15 through the second three-way electromagnetic valve 21 via the ignition switch 14 in order to energize the second three-way electromagnetic valve 21, that is, to apply a vacuum to the second diaphragm device 19 for closing fully the throttle valve 11.

Similarly, the signal $S_{10}$ sent from the load signal amplifier 25 (a signal sent from the potentiometer 18) is compared with the signal $S_{23}$ sent from the speed signal F-V converter which is preset to be smaller than $S_{21}$ but greater than $S_{22}$ by the resistor $R_1$, $R_2$, and $R_3$. When $S_{10}$ is below $S_{23}$ in potential level, the comparator $C_3$ outputs a high-level signal to turn on the switching transistor $T_3$, so that a current is passed from the battery 15 through the third three-way electromagnetic valve 22 via the ignition switch 14 in order to energize the third three-way electromagnetic valve 22, that is, to apply a vacuum to the third diaphragm device 20 for opening halfway the throttle valve 11.

In addition, in this embodiment, the detection signal $S_{30}$ sent from the coolant sensor 7 is inputted to the input terminal (−) of the comparator $C_4$ and the input terminal (+) of the comparator $C_5$ through the coolant temperature signal amplifier 27. On the other hand, a lower preset input voltage Vcc corresponding to the lower limit of coolant temperature, for instance, of 30° C. is preset to the other input terminal of the comparator $C_4$ and another higher preset input voltage Vcc' corresponding to the upper limit of coolant temperature, for instance, of 100° C. is preset to the other input terminal of the comparator $C_5$.

Accordingly, when the detected engine coolant temperature signal $S_{30}$ is below the preset input value corresponding to 30° C. or above the other preset input value corresponding to 100° C., either of the comparators $C_4$ and $C_5$ is turned on to turn on the switching transistor $T_4$ in order to connect the high-level signals sent from the comparators $C_1$, $C_2$, and $C_3$ to the respective switching transistors $T_1$, $T_2$, and $T_3$ to ground through the respective diodes $D_1$, $D_2$, and $D_3$.

Accordingly, when the engine coolant temperature drops below 30° C. or rises beyond 100° C., the three three-way electromagnetic valves 6, 21, and 22 are all deenergized forcedly irrespective of engine load or engine speed, so that the respective diaphragm devices 5, 19, and 20 are all released to the atmospheric pressure. As a result, the throttle valve 11 is fully open, the EGR control valve 4 is fully closed, and thus the EGR is inoperative under the above-mentioned engine operating conditions.

Further, in FIG. 4, the reference numeral 28 denotes a voltage regulator disposed between a battery 15 and a potentiometer 18 to stabilize the voltage and the numeral 29 denotes a surge killer to absorb the surge voltage generated from the respective three-way electromagnetic valves when these valves are turned off.

Figure 5:
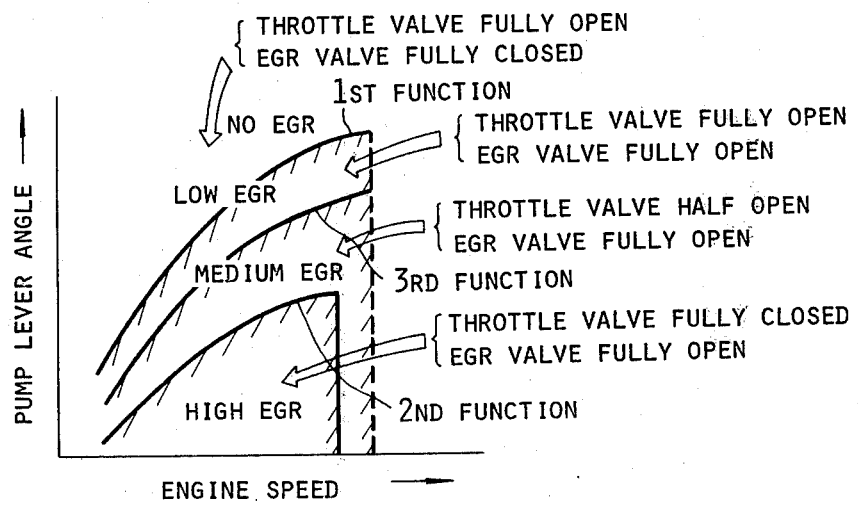
FIG. 5 is a graphical representation indicating the control characteristics of the throttle valve and the exhaust gas recirculation control valve used with the exhaust gas recirculation control system according to the present invention.

To explain in more detail with reference to FIG. 5, in the EGR control system thus constructed, the EGR control valve 4 is controlled in only the of fully-open and fully-closed positions, if the engine speed is constant, by actuating the first three-way electromagnetic valve 6 in accordance with a signal generated from the control unit 17 according to the angle of the pump lever, that is, to the engine load.

On the other hand, when the engine speed increases, the system is controlled so that the load region within which EGR operation is performed, that is, the EGR control valve 4 is fully open, also increases; when the engine speed decreases, the system is controlled so that the load region within which EGR operation is performed decreases.

In the engine operating region within which the EGR control valve 4 is fully open, the throttle valve 11 is controlled at any of the fully-open, half-open, or fully closed positions according to the angle of the pump lever, on the basis of the engine speed. Therefore, the rate of EGR is controlled in accordance with the engine operating conditions. That is to say, when the engine load is relatively small, the EGR control valve 4 is fully open and the throttle valve 11 is fully closed since vacuum is applied to the third diaphragm device 20 through the third three-way electromagnetic valve 22, so that a large amount of EGR can be obtained. After that, since vacuum is applied to the second diaphragm device 19 through the second three-way electromagnetic valve 21 in response to suitably high engine load, the system is so controlled that the throttle valve 11 becomes half open and then fully open as engine load increases in order to decrease the amount of EGR in stepwise proportion to increases in engine load.

Furthermore, as engine speed increases, the threshold loads required to trigger throttle or EGR valve operation increase, so that EGR control is optimized throughout the entire range of possible engine operating conditions.

In the manner described hereinabove, since the EGR control valve 4 and the throttle valve 11 are both opened or closed independently in accordance with the engine operating conditions so that the EGR amount can be controlled stepwise, it is possible to optimize EGR control by selectively presetting the respective input values of the comparators $C_1$, $C_2$ and $C_3$ provided for the control circuit 17 under due consideration of exhaust performance, engine operating conditions, exhaust gas composition, and so on.

In the low-speed, heavy-load region, in particular, since the EGR control valve 4 is fully closed, it is possible to suppress output of smoke, positively.

Further, since the throttle valve 11 is actuated by vacuum pressure applied from the vacuum pump 16 through the diaphragm devices 19 and 20 without linking it to the accelerator pedal, it is possible to reduce the force required to depress the accelerator pedal.

In addition, it is, of course, possible to obtain the same control results by providing two separate throttle valves 11 for the two diaphragm devices 19 and 20 in the above-mentioned embodiment.

Since the throttle valve 11 is actuated by only one diaphragm device 19, the comparator $C_3$, transistor $T_3$, and resistor $R_2$ are also unnecessary.

With regard to the control range in FIG. 5, the medium EGR operation is omitted, since the throttle valve is only controlled between the two fully-open and fully-closed positions without the stage of the half-opened position.

As described above, in the EGR control system according to the present invention, since the system is so configured that the throttle valve and the EGR control valve is controlled stepwise by the control circuit to output an appropriate control signal in accordance with the signals generated from the sensors to detect the engine operating conditions, it is possible to optimize EGR control according to the engine operating conditions, improve exhaust gas composition, and reduce the force required to depress the accelerator pedal.

It will be understood by those skilled in the art that the foregoing description is in terms of preferred embodiments of the present invention wherein various changes and modifications may be made without departing from the spirit and scope of the invention, as is set forth in the appended claims.

1 . . . Intake manifold
1a . . . Intake duct
2 . . . Exhaust manifold
3 . . . EGR duct
4 . . . EGR control valve
5 . . . Diaphragm device (First vacuum actuator)
5a . . . Pressure chamber
6 . . . First three-way electromagnetic valve
7 . . . Coolant temperature sensor
8 . . . Engine speed sensor
9 . . . Vacuum duct
10 . . . Accelerator pedal
11 . . . Throttle valve
12 . . . Fuel injection pump
13 . . . Control lever
14 . . . Ignition switch
15 . . . Battery
16 . . . Vacuum pump
17 . . . Control unit
18 . . . Potentiometer
19 . . . Second diaphragm device (Second vacuum actuator)
19b . . . Second diaphragm rod
20 . . . Third diaphragm device (Third vacuum actuator)
20b . . . Third diaphragm rod
21 . . . Second three-way electromagnetic valve
22 . . . Third three-way electromagnetic valve
23 . . . Rotational shaft
24 . . . Crank lever
25 . . . Load signal amplifier
26 . . . Speed signal F-V converter
27 . . . Coolant temp. amplifier
28 . . . Voltage regulator
29 . . . Surge killer

What is claimed is:

1. An exhaust gas recirculation control system for a diesel engine, which comprises:
    (a) an intake duct;
    (b) an exhaust duct;
    (c) an exhaust gas recirculation duct communicating between said intake duct and said exhaust duct;
    (d) a vacuum source;
    (e) an exhaust gas recirculation valve disposed on said exhaust gas recirculation duct;
    (f) a first vacuum actuator for actuating said exhaust gas recirculation valve, said first vacuum actuator being actuated by vacuum generated by said vacuum source;
    (g) a throttle valve disposed within said intake duct;
    (h) a second vacuum actuator for actuating said throttle valve, said second vacuum actuator being actuated by a vacuum generated by said vacuum source;
    (i) a third vacuum actuator for actuating said throttle valve in cooperation with said second vacuum actuator and in accordance with engine operating conditions so that said throttle valve is controlled stepwise through any of its fully-open, half-open, and fully-closed positions, said third vacuum actuator being actuated by a vacuum generated by said vacuum source; and
    (j) a control unit for controlling said first and second vacuum actuators in accordance with engine operating conditions including engine load.

2. An exhaust gas recirculation control system for a diesel engine as set forth in claim 1, which further comprises:
    (a) a first electromagnetic valve for controlling said first vacuum actuator, said first electromagnetic valve being disposed between said first vacuum actuator and said vacuum source;
    (b) a second electromagnetic valve for controlling said second vacuum actuator, said second electromagnetic valve being disposed between said second vacuum actuator and said vacuum source; and
    (c) a third electromagnetic valve for controlling said third vacuum actuator, said third electromagnetic valve being disposed between said third actuator and said vacuum source and being controlled by said control unit.

3. An exhaust gas recirculation control system for a diesel engine as set forth in claim 2, which further comprises a plurality of sensors for detecting engine operating conditions, the respective detected signals being inputted to said control unit.

4. An exhaust gas recirculation control system for a diesel engine as set forth in claim 3, wherein said exhaust gas recirculation valve is fully closed when the engine load is heavy and fully opened when the engine load is light on the basis of a first predetermined function between engine load and engine operating condition and said throttle valve is fully opened when the engine load is heavy and fully closed when the engine load is light on the basis of a second predetermined function between engine load and engine operating condition.

5. An exhaust gas recirculation control system for a diesel engine as set forth in claim 4, wherein the first and second predetermined functions between engine load and engine operating conditions are such that the threshold load required to trigger exhaust gas recirculation valve operation and throttle valve operation increases as engine speed increases, the threshold load of the first function being higher than the threshold load of the second function.

6. An exhaust gas recirculation control system for a diesel engine as set forth in claim 5, wherein said exhaust gas recirculation valve is fully closed when the engine load is heavy and fully opened when the engine load is light on the basis of the first predetermined function between engine load and engine operating condition, and said throttle valve is fully opened when the engine load is heavy, fully closed when the engine load is light on the basis of the second predetermined function between engine load and engine operating condition, and half opened when the engine load is intermediate on the basis of a third predetermined function between engine load and engine operating condition.

7. An exhaust gas recirculation control system for a diesel engine as set forth in claim 6, wherein the third predetermined function between engine load and engine operating condition is such that the threshold load required to trigger throttle valve operation increases as engine speed increases, the threshold load of the third function lying between those of the first and second predetermined functions.

8. An exhaust gas recirculation control system for a diesel engine as set forth in claim 1, wherein said intake duct is an intake manifold.

9. An exhaust gas recirculation control system for a diesel engine as set forth in claim 1, wherein said exhaust duct is an exhaust manifold.

10. An exhaust gas recirculation control system for a diesel engine as set forth in claim 1, wherein said vacuum source is a vacuum pump.

11. An exhaust gas recirculation control system for a diesel engine as set forth in claim 1, wherein said vacuum source is vacuum generated in said intake duct downstream from said throttle valve.

12. An exhaust gas recirculation control system for a diesel engine as set forth in claim 1, wherein said first vacuum actuator is a diaphragm device including a diaphragm actuated in accordance with engine operating conditions by vacuum generated by said vacuum source, and a diaphragm rod fixedly connected to the diaphragm to directly actuate said exhaust gas control valve.

13. An exhaust gas recirculation control system for a diesel engine as set forth in claim 1, wherein said second vacuum actuator is a diaphragm device including a diaphragm actuated in accordance with engine operating conditions by vacuum generated by said vacuum source, and a diaphragm rod fixedly connected to the diaphragm to actuate said throttle valve through a crank lever to which said diaphragm rod is pivotably linked.

14. An exhaust gas recirculation control system for a diesel engine as set forth in claim 1, wherein said third vacuum actuator is a diaphragm device including a diaphragm actuated in accordance with engine operating conditions by vacuum generated by said vacuum source, and a diaphragm rod fixedly connected to the diaphragm, the end of which is bent into a hooking configuration, so as to actuate said throttle valve to the half-open position through a crank lever to which said diaphragm rod is brought into contact when the diaphragm is actuated.

15. An exhaust gas recirculation control system for a diesel engine as set forth in claim 2, wherein said first, second and third electromagnetic valves are three-way electromagnetic valves for applying vacuum from said vacuum source to said diaphragm devices when energized and to vent said diaphragm devices to the atmosphere when deenergized by the respective signals sent from said control unit.

16. An exhaust gas recirculation control system for a diesel engine as set forth in claim 3, wherein one of said plurality of sensors is a potentiometer to detect the load on the engine, said potentiometer being disposed within a fuel injection pump so as to cooperate with a control lever thereof.

17. An exhaust gas recirculation control system for a diesel engine as set forth in claim 3, wherein one of said plurality of sensors is a sensor to detect the temperature of engine coolant.

18. An exhaust gas recirculation control system for a diesel engine as set forth in claim 3, wherein one of said plurality of sensors is a sensor to detect the speed of the engine.

19. An exhaust gas recirculation control system for a diesel engine as set forth in claim 1, wherein said control unit comprises:
(a) a load signal amplifier for amplifying a signal representative of the load of the engine into a load signal ($S_{10}$);
(b) an engine operation signal F-V converter for converting a digital signal representative of one of the engine operating conditions into a first signal ($S_{21}$);
(c) a first comparator ($C_1$) for comparing the load signal ($S_{10}$) with a first signal ($S_{21}$) from said engine operating signal F-V converter and for outputting a signal to energize said first three-way electromagnetic valve so as to open said exhaust gas recirculation valve when the load signal ($S_{10}$) is smaller than the first signal ($S_{21}$);
(d) a second comparator ($C_2$) for comparing the load signal ($S_{10}$) with a second signal ($S_{22}$) preset to be smaller than the first signal ($S_{21}$) and for outputting a signal to energize said second three-way electromagnetic valve so as to fully close said throttle valve when the load signal ($S_{10}$) is smaller than the second signal ($S_{22}$); and
(e) a third comparator ($C_3$) for comparing the load signal ($S_{10}$) with a third signal ($S_{23}$) preset to be smaller than the first signal ($S_{21}$) but greater than the second signal ($S_{22}$) and for outputting a signal to energize said third three-way electromagnetic valve so as to half close said throttle valve when the load signal ($S_{10}$) is smaller than the third signal ($S_{23}$).

20. An exhaust gas recirculation control system for a diesel engine as set forth in claim 19 which further comprises:
   (a) an engine operating condition amplifier for amplifying a signal representative of a second engine operating condition into a second engine operating signal ($S_{30}$);
   (b) a fourth comparator ($C_4$) for comparing the second engine operating signal ($S_{30}$) with a lower limit of the second engine operating condition and for outputting a signal to deenergize said first, second, and third three-way electromagnetic valve so as to fully close said exhaust gas recirculation valve and to fully open said throttle valve when the second engine operating signal ($S_{30}$) is smaller than the preset value representative of the lower limit of the engine operating condition; and
   (c) a fifth comparator ($C_5$) for comparing the second engine operating signal ($S_{30}$) with an upper limit of the second engine operating condition and for outputting a signal to deenergize said first, second, and third three-way electromagnetic valve so as to fully close said exhaust gas recirculation valve and to fully open said throttle valve when the second engine operating signal ($S_{30}$) is greater than the preset value representative of the upper limit of the second engine operating condition.

21. An exhaust gas recirculation control system for a diesel engine as set forth in claim 20, which further comprises:
   (a) first switching means ($T_1$) for actuating said first three-way electromagnetic valve in response to a signal from said first comparator ($C_1$);
   (b) second switching means ($T_2$) for actuating said second three-way electromagnetic valve in response to a signal from said second comparator ($C_2$); and
   (c) third switching means ($T_3$) for actuating said third three-way electromagnetic valve in response to a signal from said third comparator ($C_3$).

22. An exhaust gas recirculation control system for a diesel engine as set forth in claim 21, wherein said first, second, and third switching means ($T_1$, $T_2$, $T_3$) are transistors.

23. An exhaust gas recirculation control system for a diesel engine as set forth in claim 21, which further comprises a voltage regular to stabilize the variations and fluctuations in voltage of the battery.

24. An exhaust gas recirculation control system for a diesel engine as set forth in claim 23, which further comprises a surge killer to absorb surge voltage generated from said three-way electromagnetic valves.

25. A method of controlling exhaust gas recirculation for a diesel engine, which comprises the following steps:
   (a) detecting the load of an engine;
   (b) detecting an engine operating condition;
   (c) comparing a signal ($S_{10}$) representative of the detected engine load with a first signal ($S_{21}$) representative of the detected engine operating condition on the basis of a first predetermined voltage function between the two;
   (d) opening an exhaust gas recirculation valve fully when the signal ($S_{10}$) representative of the detected engine load is smaller than the first signal ($S_{21}$) representative of the detected engine operating condition and closing the exhaust gas recirculation valve fully when $S_{10}$ is greater than $S_{21}$;
   (e) comparing the signal ($S_{10}$) representative of the detected engine load with a second signal ($S_{22}$) representative of the detected engine operating condition on the basis of a second predetermined voltage function between the two which is preset to be more sensitive to $S_{10}$ than the first predetermined voltage function; and
   (f) closing a throttle valve fully, within the range where the exhaust gas recirculation valve is fully opened, when the signal ($S_{10}$) representative of the detected engine load is smaller than the second signal ($S_{22}$) representative of the detected engine operating condition and opening the throttle valve fully when $S_{10}$ is greater than $S_{22}$.

26. A method of controlling exhaust gas recirculation for a diesel engine as set forth in claim 25, which further comprises the steps of:
   (a) comparing the signal ($S_{10}$) representative of the detected engine load with a third signal ($S_{23}$) representative of the detected engine operating condition on the basis of a third predetermined voltage function between the two which is more sensitive to $S_{10}$ than the first predetermined voltage function but less sensitive to $S_{10}$ than the second predetermined voltage function; and
   (b) closing the throttle valve half, within the range where the exhaust gas recirculation valve is fully opened, when the signal ($S_{10}$) representative of the detected engine load is smaller than the third signal ($S_{23}$) representative of the detected engine operating condition and opening the throttle valve fully when $S_{10}$ is greater than $S_{23}$.

27. A method of controlling exhaust gas recirculation for a diesel engine as set forth in claim 25, which further comprises the steps of:
   (a) detecting a second engine operating condition;
   (b) comparing a signal ($S_{30}$) representative of the second detected engine operating condition with signals (Vcc, Vcc') representative of the predetermined lower and upper limits thereof; and
   (c) closing the exhaust gas recirculation valve fully and opening the throttle valve fully when the signal ($S_{30}$) representative of the second detected engine operating condition lies outside of the lower and upper limits, irrespective of the other engine operating conditions.

28. A method of controlling exhaust gas recirculation for a diesel engine as set forth in any of claims 25 and 26, wherein the load on the engine is detected by the use of a potentiometer disposed so as to detect the angle of a lever provided for a fuel injection pump.

29. A method of controlling exhaust gas recirculation for a diesel engine as set forth in any of claims 25 and 26, wherein the engine operating condition is engine speed.

30. A method of controlling exhaust gas recirculation for a diesel engine as set forth in claim 25, wherein the second engine operating condition is coolant temperature.

* * * * *